Aug. 21, 1951  L. FALLER  2,564,680
BRONZING MACHINE
Filed April 20, 1948  2 Sheets-Sheet 2

INVENTOR
LEOPOLD FALLER
BY
ATTORNEY

Patented Aug. 21, 1951

2,564,680

UNITED STATES PATENT OFFICE 2,564,680

BRONZING MACHINE

Leopold Faller, Brooklyn, N. Y.

Application April 20, 1948, Serial No. 22,110

12 Claims. (Cl. 91—59)

This invention relates to an applying machine, and more particularly to a so-called bronzing machine for applying powders and especially metallic powders to the faces of sheets.

An object of the present invention is to provide a bronzing machine with means eliminating the undesired adhering of sheets to the conveying belt of the machine at the delivery end of the latter.

A further object of the present invention is to provide a bronzing machine with means, by means of which sheets are automatically lifted from the conveyor belt of the machine at the delivery end of the machine, so that even sheets of extremely light weight, such as sheets of tissue paper or thin transparent sheets of a material known in the trade as "cellophane" may be passed through the machine without damage to such sheets at the delivery end of the machine where the sheets are discharged from the conveyor belt.

Another object of the present invention is to improve on the art of bronzing machines as now ordinarily made.

Figure 1:
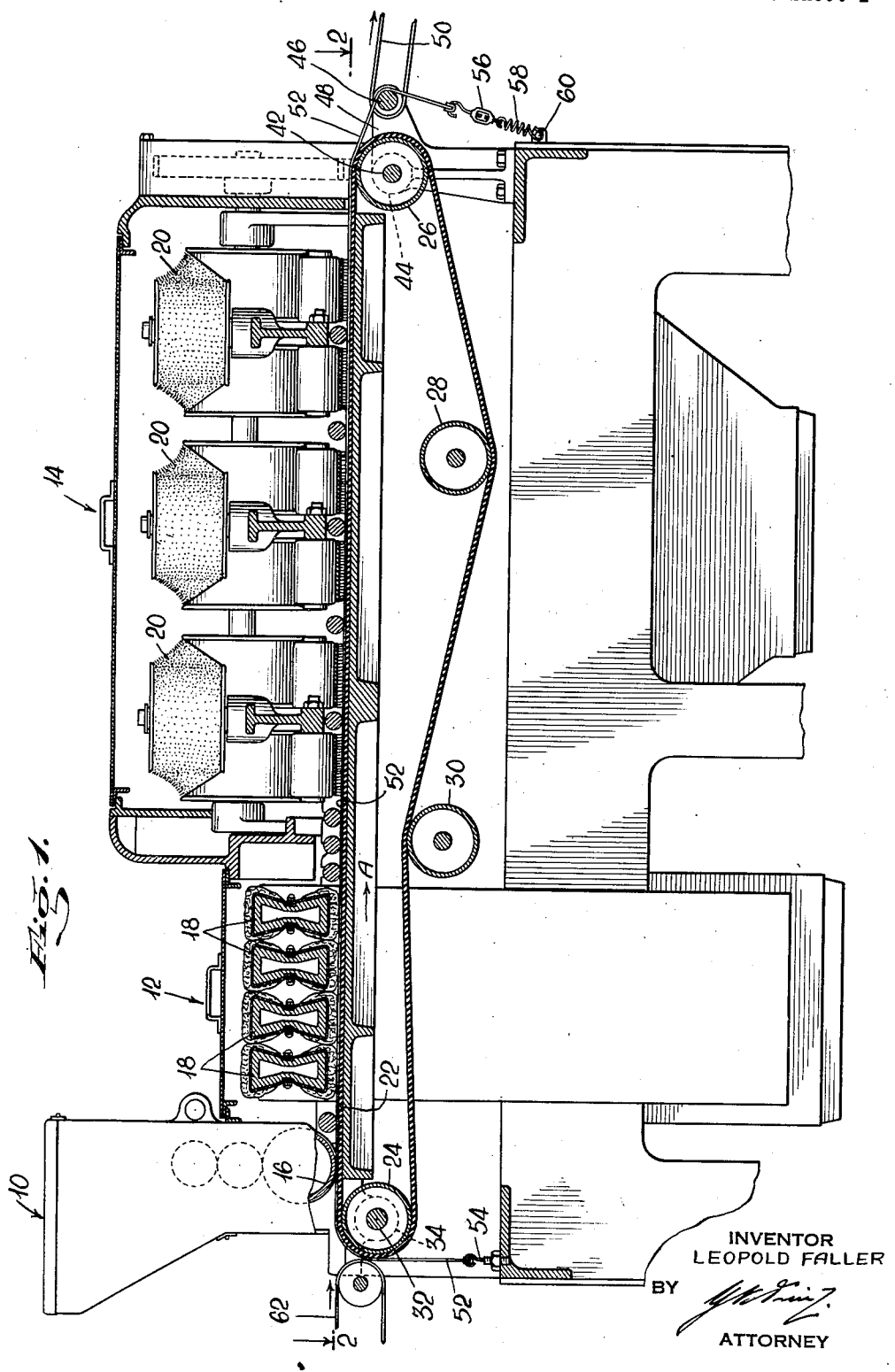
Figure 2:
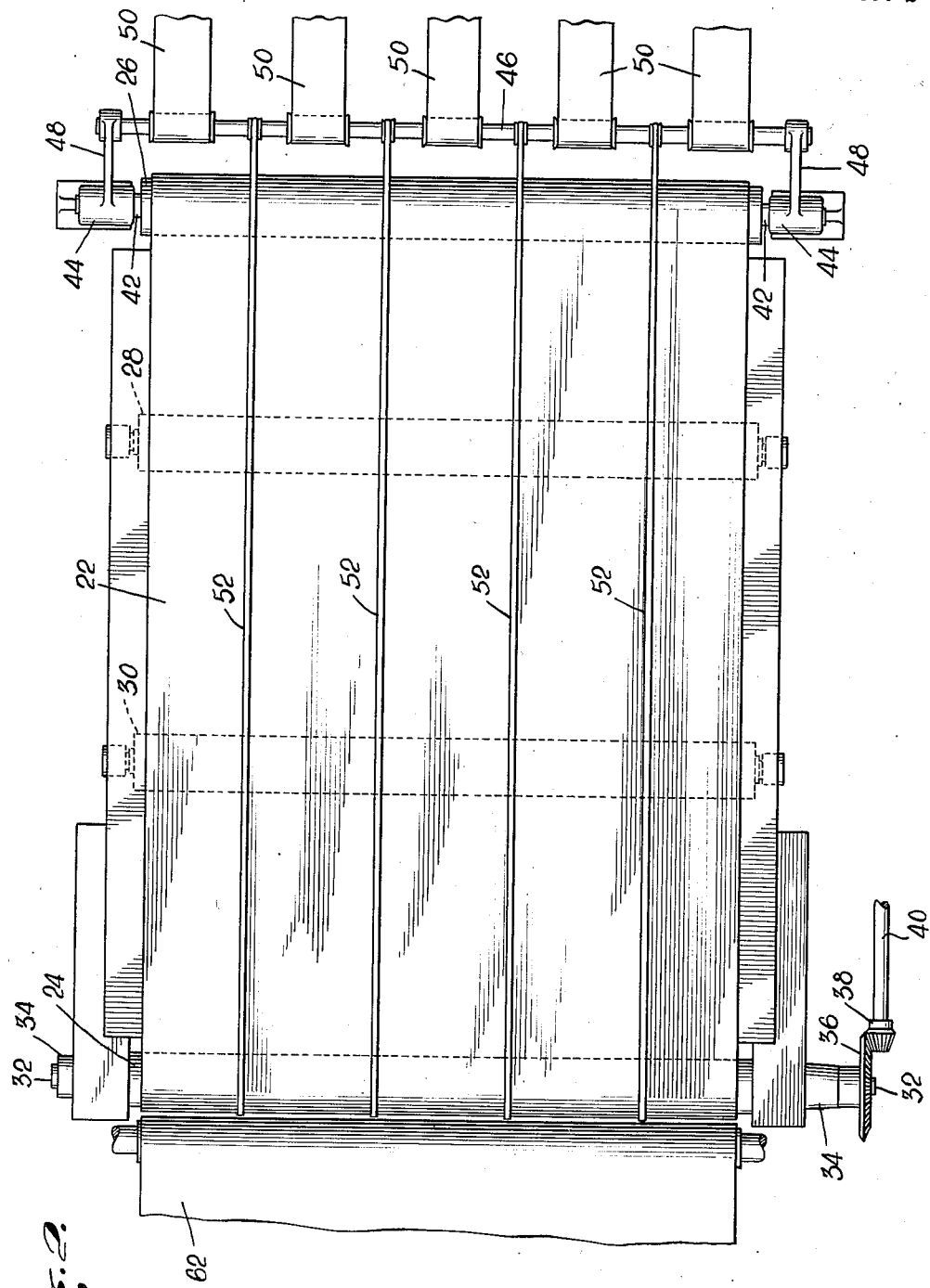

With the above and other objects of the invention in view, the invention consists in the novel construction, arrangement and combination of various devices, elements and parts, as set forth in the claims hereof, certain embodiments of the same being described in the specification and being illustrated in the accompanying drawings forming part of the specification, wherein:

Fig. 1 is a fragmentary vertical sectional view of a bronzing machine according to the invention, and Fig. 2 is a view taken on line 2—2 of Fig. 1.

Referring now to Fig. 1, 10 generally indicates the supplying or depositing section of a bronzing machine, 12 generally indicates the coating section of the bronzing machine and 14 generally indicates the cleaning section of the bronzing machine. Said sections 10, 12 and 14 may be of any desirable construction, for example, of the construction shown in the drawings and described more particularly in my co-pending application relating to a bronzing machine Ser. #21,478 filed on April 16, 1948. In the supplying section 10 metallic powder, for example, bronze powder is supplied by a supply roller 16 to the sheets to be coated; in the coating section 12 the sheets are coated with the metallic powder and the coated surfaces are burnished by reciprocating burnishers 18; in the cleaning section 14 excess metallic powder is removed from the sheets by means of moving dusting bands 20.

As shown in Figs. 1 and 2, an endless conveying belt 22 of the bronzing machine for transporting sheets from the receiving end of the machine to the delivering end of the machine in the direction of the arrow A is trained around rollers 24, 26, 28 and 30 journalled in a suitable manner in the machine. Preferably, said conveying belt 22 is made of rubber or a rubberized fabric, however, it could also be made of another suitable material.

The roller 24 represents a driving roller secured to a shaft 32 journalled in bearings 34 mounted on the frame of the machine. A bevel gear 36 keyed to said shaft 32 is in mesh with a bevel gear 38 keyed to a shaft 40 which, in turn, is driven by a motor (not shown).

The roller 26 represents an idling roller mounted on a shaft 42 carried by bearings 44 mounted on the frame of the machine.

The rollers 28 and 30 constitute tensioning rollers, which are adjustably arranged in the machine (in a manner not shown) for adjusting the tension in the conveying belt 22.

A shaft 46 arranged at the delivering end of the machine at a distance from the idling roller 26 is carried by brackets 48. In the embodiment shown in the drawings, said shaft 46 constitutes a part of a conveyor comprising a series of conveying belts 50. Said conveyor 50 serves to convey sheets delivered from the delivering end of the machine to a suitable place.

There is a series of band-like elements such as strings 52 arranged adjacent the surface of the conveying belt 22 which receives and transports the sheets in the direction of the arrow A. One end of each string 52 is attached to the frame of the machine at 54 near the sheet receiving end of the machine. The other end portion of each string 52 trained around the shaft 48 is connected to a hook of an adjustable stretching screw 56, the other hook of which is connected to one end of a tensioning spring 58 attached at its other end to the frame of the machine at 60. Thus, each string 52 is held under tension by the tensioning spring 58 and the tension in each spring may be adjusted by an adjustment of the stretching screw 56. Each string 52 extending from the sheet receiving end of the machine to the sheet delivering end thereof contacts the surface of the upper side of the conveying belt 22 which transports the sheets through the machine.

The sheets to be coated in the machine are fed to the sheet receiving end of the machine from a suitable place, for example, a printing press, by means of a conveyor 62 which may be driven in any suitable manner.

The series of strings 52 thus arranged in the machine constitute grid-like means which automatically lift the sheets from the conveying belt 22 at the delivering end of the bronzing machine.

The strings 52 are arranged in such a manner at the sheet receiving end of the machine by contacting the conveying belt 22 around a portion of the driving roller 24 that sheets fed to the bronzing machine by the conveyor 62 are placed on the conveying belt 22 on top of the strings 52 which thus are between the sheets and the conveying belt 22 during the passage of the sheets through the machine.

During the operation of the machine the reciprocating burnishers 18 and the dusting bands 20 are moved in a direction perpendicular to the direction of the movement of the upper side of the conveying belt 22 through the machine. Owing to the friction thus caused and maybe also owing to the atmospheric condition in the room where the bronzing machine is located, an electrostatic charge of the conveying belt 22 will occur after a short period of operation of the machine. Such an electrostatic charge of the conveying belt 22 causes the sheets placed on the conveying belt 22 to adhere to the surface of said conveying belt 22. The strings 52, however, assure at the delivering end of the machine a safe lifting of the sheets from the surface of the conveying belt 22 and discharge onto the conveyor 50. Thus, it becomes unnecessary to stop the machine and to discharge by certain discharging devices the conveying belt 22 when the electrostatic charge of said conveying belt 22 would become so high that the sheets stick to the conveying belt and are repeatedly transported through the machine as it happens in hitherto known bronzing machines.

I have described a preferred embodiment of my invention, but it is understood that this disclosure is for the purpose of illustration and that various omissions or changes in shape, proportion and arrangement of parts, as well as the substitution of equivalent elements for those herein shown and described may be made without departing from the spirit and scope of the invention as set forth in the appended claims.

For example, instead of the strings 52 shown in the drawings, bands of narrow width could also be used.

Furthermore, instead of springs 58, weights could be used for holding the strings or bands under tension.

What I claim is:

1. In a bronzing machine for coating surfaces of sheets with metal powder, the combination of: a series of rollers journalled in the machine, an endless conveying belt trained around said rollers for transporting sheets through the machine, an actuating drive connected to such a roller for rotating same and driving the conveying belt, a first roller of said series of rollers being arranged at the sheet receiving end of the machine, a second roller of said series of rollers being arranged at the sheet delivering end of the machine, a series of movable treating elements arranged for treating engagement with sheets transported by said conveying belt, grid-like stripping means arranged in the machine between said treating elements and the surface of the conveying belt which receives and transports the sheets, said grid-like stripping means extending from the sheet receiving end of the machine to the sheet delivering end thereof, and feeding means arranged for feeding the sheets onto said stripping means and said sheet receiving surface of said conveying belt.

2. In a bronzing machine for coating surfaces of sheets with metal powder, the combination of: a series of rollers journalled in the machine, an endless conveying belt trained around said rollers for transporting sheets through the machine, an actuating drive connected to such a roller for rotating same and driving the conveying belt, a first roller of said series of rollers being arranged at the sheet receiving end of the machine, a second roller of said series of rollers being arranged at the sheet delivering end of the machine, a series of movable treating elements arranged for treating engagement with sheets transported by said conveying belt, at least one band-like stripping element arranged in the machine between said treating elements and the surface of the conveying belt which receives and transports the sheets, said band-like stripping element extending from the sheet receiving end of the machine to the sheet delivering end thereof, and feeding means arranged for feeding the sheets onto said band-like stripping element and said sheet receiving surface of said conveying belt.

3. In a bronzing machine for coating surfaces of sheets with metal powder, the combination of: a series of rollers journalled in the machine, an endless conveying belt trained around said rollers for transporting sheets through the machine, an actuating drive connected to such a roller for rotating same and driving the conveying belt, a first roller of said series of rollers being arranged at the sheet receiving end of the machine, a second roller of said series of rollers being arranged at the sheet delivering end of the machine, at least one band-like element arranged in the machine, one end of said band-like element being attached to the machine, said band-like element contacting from the sheet receiving end to the sheet delivering end of the machine the surface of the conveying belt which receives and transports the sheets, and a load acting on the other end of said band-like element at the sheet delivering end of the machine.

4. In a bronzing machine for coating surfaces of sheets with metal powder, the combination of: a series of rollers journalled in the machine, an endless conveying belt trained around said rollers for transporting sheets through the machine, an actuating drive connected to such a roller for rotating same and driving the conveying belt, a first roller of said series of rollers being arranged at the sheet receiving end of the machine, a second roller of said series of rollers being arranged at the sheet delivering end of the machine, at least one band-like element arranged in the machine, one end of said band-like element being attached to the machine, said band-like element contacting from the sheet receiving end to the sheet delivering end of the machine the surface of the conveying belt which receives and transports the sheets, and a spring, one end of said spring being connected to the other side of said band-like element at the sheet delivering end of the machine, the other end of said spring being attached to the machine.

5. In a bronzing machine as claimed in claim 4, means associated with said spring for adjusting the tension thereof.

6. In a bronzing machine for coating surfaces of sheets with metal powder, the combination of: a series of rollers journalled in the machine, an endless conveying belt trained around said rollers for transporting sheets through the machine, an actuating drive connected to such a roller for rotating same and driving the conveying belt, a first roller of said series of rollers being arranged at the sheet receiving end of the machine, a second roller of said series of rollers being arranged at the sheet delivering end of the machine, at least one band-like element arranged in the machine, one end of said band-like element being attached to the machine, said band-like element contacting from the sheet receiving end to the sheet delivering end of the machine the surface of the conveying belt which receives and transports the sheets, a shaft arranged at the delivering end of the machine at a distance from said second roller, the other end portion of said band-like element being trained around said shaft, and a load acting on said other end portion of the band-like element.

7. In a bronzing machine as claimed in claim 6, said shaft constituting a part of a delivering conveyor.

8. In a bronzing machine for coating surfaces of sheets with metal powder, the combination of: a series of rollers journalled in the machine, an endless conveying belt trained around said rollers for transporting sheets through the machine, an actuating drive connected to such a roller for rotating same and driving the conveying belt, a first roller of said series of rollers being arranged at the sheet receiving end of the machine, a second roller of said series of rollers being arranged at the sheet delivering end of the machine, a series of spaced strings, each of said strings being attached at one of its ends to the machine, each string contacting from the sheet receiving end to the sheet delivering end of the machine the surface of the conveying belt which receives and transports the sheets, a shaft arranged at the delivering end of the machine at a distance from said second roller, the other end portion of each string being trained around said shaft, and a load acting on said other end portion of each string.

9. In a bronzing machine for coating surfaces of sheets with metal powder, the combination of: a series of rollers journalled in the machine, an endless conveying belt trained around said rollers for transporting sheets through the machine, an actuating drive connected to such a roller for rotating same and driving the conveying belt, a first roller of said series of rollers being arranged at the sheet receiving end of the machine, a second roller of said series of rollers being arranged at the sheet delivering end of the machine, a series of spaced strings, each of said strings being attached at one of its ends to the machine, each string contacting from the sheet receiving end to the sheet delivering end of the machine the surface of the conveying belt which receives and transports the sheets, a shaft arranged at the delivering end of the machine at a distance from said second roller, the other end portion of each string being trained around said shaft, and a load acting on said shaft, and a series of springs, one end of each spring being connected to said other end portion of such a string, the other end of each spring being attached to the machine.

10. In a bronzing machine as claimed in claim 9, means associated with each spring for adjusting the tension thereof.

11. In a bronzing machine as claimed in claim 8, said shaft constituting a part of a delivering conveyor.

12. In a bronzing machine for coating surfaces of sheets with metal powder, the combination of: a series of rollers journalled in the machine, an endless conveying belt trained around said rollers for transporting sheets through the machine, an actuating drive connected to such a roller for rotating same and driving the conveying belt, a first roller of said series of rollers being arranged at the sheet receiving end of the machine, a second roller of said series of rollers being arranged at the sheet delivering end of the machine, and grid-like stripping means arranged in the machine, said grid-like stripping means extending from the sheet receiving end of the machine to the sheet delivering end thereof, and said grid-like stripping means contacting from said sheet receiving end to said sheet delivering end the surface of the conveying belt which receives and transports the sheets.

LEOPOLD FALLER.

REFERENCES CITED

The following references are of record in the file of this patent:

UNITED STATES PATENTS

| Number | Name | Date |
|---|---|---|
| 447,101 | Buchanan | Feb. 24, 1891 |
| 499,169 | Kane | June 6, 1893 |
| 1,070,933 | Wilson | Aug. 19, 1913 |
| 1,149,796 | Tate | Aug. 10, 1915 |